United States Patent
Hohwald et al.

(10) Patent No.: US 10,740,385 B1
(45) Date of Patent: Aug. 11, 2020

(54) IDENTIFYING VISUAL PORTIONS OF VISUAL MEDIA FILES RESPONSIVE TO SEARCH QUERIES

(71) Applicant: SHUTTERSTOCK, INC., New York, NY (US)

(72) Inventors: Heath Hohwald, Logrono (ES); Kevin Scott Lester, Summit, NJ (US)

(73) Assignee: Shutterstock, Inc., New York, NY (US)

( * ) Notice: Subject to any disclaimer, the term of this patent is extended or adjusted under 35 U.S.C. 154(b) by 606 days.

(21) Appl. No.: 15/135,124

(22) Filed: Apr. 21, 2016

(51) Int. Cl.
| | |
|---|---|
| *G06F 16/56* | (2019.01) |
| *G06F 16/14* | (2019.01) |
| *G06F 16/9535* | (2019.01) |
| *G06F 16/532* | (2019.01) |
| *G06F 16/432* | (2019.01) |
| *G06F 16/58* | (2019.01) |
| *G06F 16/51* | (2019.01) |
| *G06F 16/583* | (2019.01) |

(52) U.S. Cl.
CPC ............ *G06F 16/56* (2019.01); *G06F 16/148* (2019.01); *G06F 16/156* (2019.01); *G06F 16/532* (2019.01); *G06F 16/9535* (2019.01); *G06F 16/434* (2019.01); *G06F 16/51* (2019.01); *G06F 16/5838* (2019.01); *G06F 16/5866* (2019.01)

(58) Field of Classification Search
CPC ......... G06F 17/30256; G06F 17/30265; G06F 17/30268; G06F 17/30277; G06F 17/3028; G06F 17/30253; G06F 17/30259; G06F 17/30554; G06K 9/00677; G06K 2009/00328

USPC ........ 707/706, 723, 741, 758, 780, E17.019, 707/E17.023
See application file for complete search history.

(56) References Cited

U.S. PATENT DOCUMENTS

| | | | |
|---|---|---|---|
| 8,365,103 B1 | 1/2013 | Gennari | |
| 8,438,163 B1 | 5/2013 | Li | |
| 8,885,984 B1 | 11/2014 | Lavi | |
| 8,995,716 B1 * | 3/2015 | Zomet | G06K 9/00664 382/103 |
| 9,754,177 B2 * | 9/2017 | Liu | G06K 9/3233 |
| 9,946,932 B2 * | 4/2018 | Holzschneider | G06F 17/30256 |
| 2001/0016058 A1 | 8/2001 | Zeng | |
| 2006/0253491 A1 * | 11/2006 | Gokturk | G06F 16/5838 |
| 2007/0091376 A1 | 4/2007 | Calhoon | |
| 2007/0239683 A1 * | 10/2007 | Gallagher | G06F 17/30265 |
| 2010/0332475 A1 * | 12/2010 | Birdwell | G06K 9/6224 707/737 |
| 2011/0038512 A1 * | 2/2011 | Petrou | G06F 17/30256 382/118 |

(Continued)

*Primary Examiner* — Dangelino N Gortayo
(74) *Attorney, Agent, or Firm* — McDermott, Will & Emery LLP

(57) ABSTRACT

Methods for identifying visual portions of visual media files responsive to search queries are provided. In one aspect, a method includes identifying, for each of a plurality of visual media files from a collection of media files, visual portions of the plurality of visual media files responsive to a group of search queries, and providing, in response to a search query from the group of search queries, an identifier of a visual portion of at least one of the plurality of visual media files for display as responsive to the search query. Systems and machine-readable media are also provided.

18 Claims, 7 Drawing Sheets

(56) References Cited

U.S. PATENT DOCUMENTS

| | | | |
|---|---|---|---|
| 2012/0072410 A1* | 3/2012 | Wang | G06F 16/5866 |
| | | | 707/711 |
| 2012/0076408 A1* | 3/2012 | Suk | G06K 9/3241 |
| | | | 382/173 |
| 2012/0143856 A1* | 6/2012 | Klinkigt | G06K 9/4671 |
| | | | 707/723 |
| 2013/0170752 A1 | 7/2013 | Ramnath Krishnan | |
| 2014/0149376 A1* | 5/2014 | Kutaragi | G06K 9/4676 |
| | | | 707/706 |
| 2014/0254922 A1 | 9/2014 | Wang | |
| 2014/0328544 A1 | 11/2014 | Wang | |
| 2015/0170000 A1* | 6/2015 | Yang | G06K 9/6267 |
| | | | 382/224 |
| 2016/0140146 A1 | 5/2016 | Wexler | |
| 2016/0162758 A1* | 6/2016 | Prest | G06K 9/52 |
| | | | 382/159 |
| 2017/0024384 A1* | 1/2017 | Kant | G06F 16/51 |
| 2017/0132425 A1* | 5/2017 | Koch | G06F 21/6218 |
| 2017/0154204 A1* | 6/2017 | Ryu | G06K 9/00208 |

\* cited by examiner

IDENTIFYING VISUAL PORTIONS OF VISUAL MEDIA FILES RESPONSIVE TO SEARCH QUERIES

BACKGROUND

Field

The present disclosure generally relates to identifying portions of individual data files stored in a data file repository as responsive to search queries submitted to the data file repository.

Description of the Related Art

Network accessible data file repositories for content commonly hosted on server devices ordinarily provide users of client devices with the ability to access search algorithms for searching and accessing data files for content in the data file repositories. For example, for a network accessible media content repository with a large volume of data files, such as for images and videos, a user that seeks to search for media related to cats may enter the search query "cats" into a search interface for the online image content repository accessible by and displayed on the user's client device. Media associated with the keyword "cat" or "cats" that is determined by the server to be responsive to the search query may then be returned to the client device for display to the user, while other media that may include images or illustrations of cats along with other animals may be determined by the server to not be responsive to the search query "cats".

SUMMARY

The disclosed system provides for the identification of visual portions of visual media files from a media file repository as being responsive to a search query submitted to the media file repository, and provides identifiers (e.g., thumbnails) of those visual portions of visual media files for display in response to the search query for inclusion with identifiers of entire media files from the media file repository responsive to the search query for display. The visual portions of the media files can be identified based on previous user action, by object recognition, visual similarity, or various other techniques.

According to certain aspects of the present disclosure, a computer-implemented method for identifying visual portions of visual media files responsive to search queries is provided. The method includes identifying, for each of a plurality of media files from a collection of media files, portions of the plurality of media files responsive to a group of search queries, and providing, in response to a search query from the group of search queries, an identifier of a portion of at least one of the plurality of media files for display as responsive to the search query.

According to certain aspects of the present disclosure, a system for identifying visual portions of visual media files responsive to search queries is provided. The system includes a memory that includes instructions, and a processor. The processor is configured to execute the instructions to identify, for each of a plurality of media files from a collection of media files, portions of the plurality of media files responsive to a group of search queries, and provide, in response to a search query from the group of search queries, an identifier of a portion of at least one of the plurality of media files for display as responsive to the search query.

According to certain aspects of the present disclosure, a non-transitory machine-readable storage medium including machine-readable instructions for causing a processor to execute a method for identifying visual portions of visual media files responsive to search queries is provided. The method includes identifying, for each of a plurality of media files from a collection of media files, portions of the plurality of media files responsive to a group of search queries and identifying a data vector associated with a portion of at least one of the plurality of media files from the collection of media files as exceeding a similarity threshold value to another visual media file responsive to the search query. The method further includes providing a thumbnail of the visual portion of the at least one of the plurality of media files for display.

According to certain aspects of the present disclosure, a system for identifying visual portions of visual media files responsive to search queries is provided. The system includes means for identifying, for each of a plurality of media files from a collection of media files, portions of the plurality of media files responsive to a group of search queries, and means for providing, in response to a search query from the group of search queries, an identifier of a portion of at least one of the plurality of media files for display as responsive to the search query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
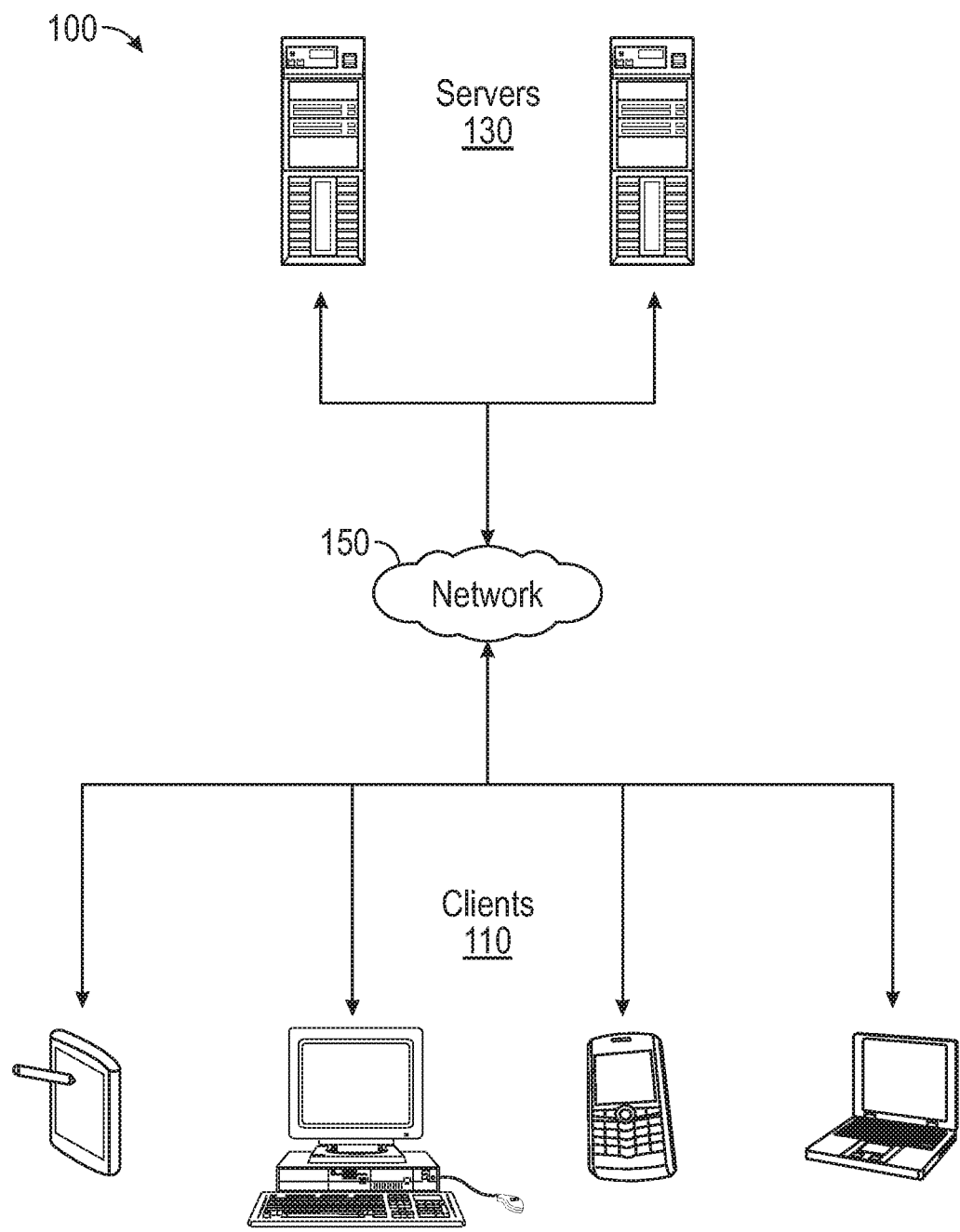
FIG. 1 illustrates an example architecture for identifying visual portions of visual media files responsive to search queries.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for the identification of visual portions of individual visual media files from a collection of media files as being responsive to search queries, and providing those visual portions of the visual media files in response to search queries to the collection of media files. As discussed herein, a visual media file is a file intended to be displayed visually such as an image, video recording (with or without audio), or visual multimedia (e.g., slideshows), and a "visual portion" of a visual media file a displayed portion of a greater visual media file, such as a cropped portion of an image. The individual visual media files can be divided or otherwise apportioned into the visual portions based on various techniques such as a sliding window algorithm, and further optimized by techniques such as object recognition, visual similarity analysis, and past user behavior. Once relevant visual portions of visual media files are identified as responsive to a search query, identifiers (e.g., thumbnails) of the visual portions of the visual media files can be provided for display in response to the search query, optionally along with identifiers of entire individual media files from the collection.

The disclosed system addresses a technical problem of identifying data files from a data file repository that are responsive to a search query by improving a technical solution associated with the technical problem, namely the technical solution of identifying data files from the data file repository as being responsive based on relevance. The technical solution includes the analysis of different portions of each data file, namely each media file from the collection of media files, to determine whether the portions are responsive to various search queries.

By returning visual portions of visual media files as responsive to a search query optionally with entire individual media files from the collection in response to a search query, various advantages are achieved. These advantages include, for example, increasing the number of visual media files as responsive to a search query by including visual portions of visual media files as responsive that would not otherwise, as an entire individual visual media file, be considered responsive to the search query. As a result, instead of having, for example, 1000 results (i.e., 1000 individual image files) as responsive to the search query "cats", 1500 results (i.e., 1000 individual image files and 500 portions of image files) can be displayed as responsive to the search query "cats" from the same size media file collection.

FIG. 1 illustrates an example architecture 100 for identifying visual portions of visual media files responsive to search queries. The architecture 100 includes servers 130 and clients 110 connected over a network 150.

One of the many servers 130 is configured to host a media file portion identifier, a collection of media files, and a media file search engine. For purposes of load balancing, multiple servers 130 can host the media file portion identifier, the collection of media files that includes visual media files, and the media file search engine. In certain aspects, however, visual media files and corresponding data vectors, if existing, may be provided over the network 150 from other devices, such as devices owned by users that generate the media files for consumption.

The servers 130 can be any device having an appropriate processor, memory, and communications capability for hosting the media file portion identifier, the collection of media files, and the media file search engine. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

The disclosed system, which may be available via one or many of the servers 130, provides for the identification of visual portions of visual media files from a collection of media files as relevant to various search queries. Subsequently, in response to the submission on one of the clients 110 of one of the various search queries to a search engine for the collection of media files, the disclosed system retrieves and provides identifiers of visual portions of visual media files responsive to the submitted search query for display in response to the search query. Identifiers of entire individual media files responsive to the submitted search query can also be provided for display by the disclosed system in response to the search query. The visual portions of the media files can be analyzed using various techniques and information, including, for example, object recognition, visual similarity analysis, or past user behavior (e.g., past or current user provided information associating a portion of an image as associated with a keyword or object).

Figure 2:
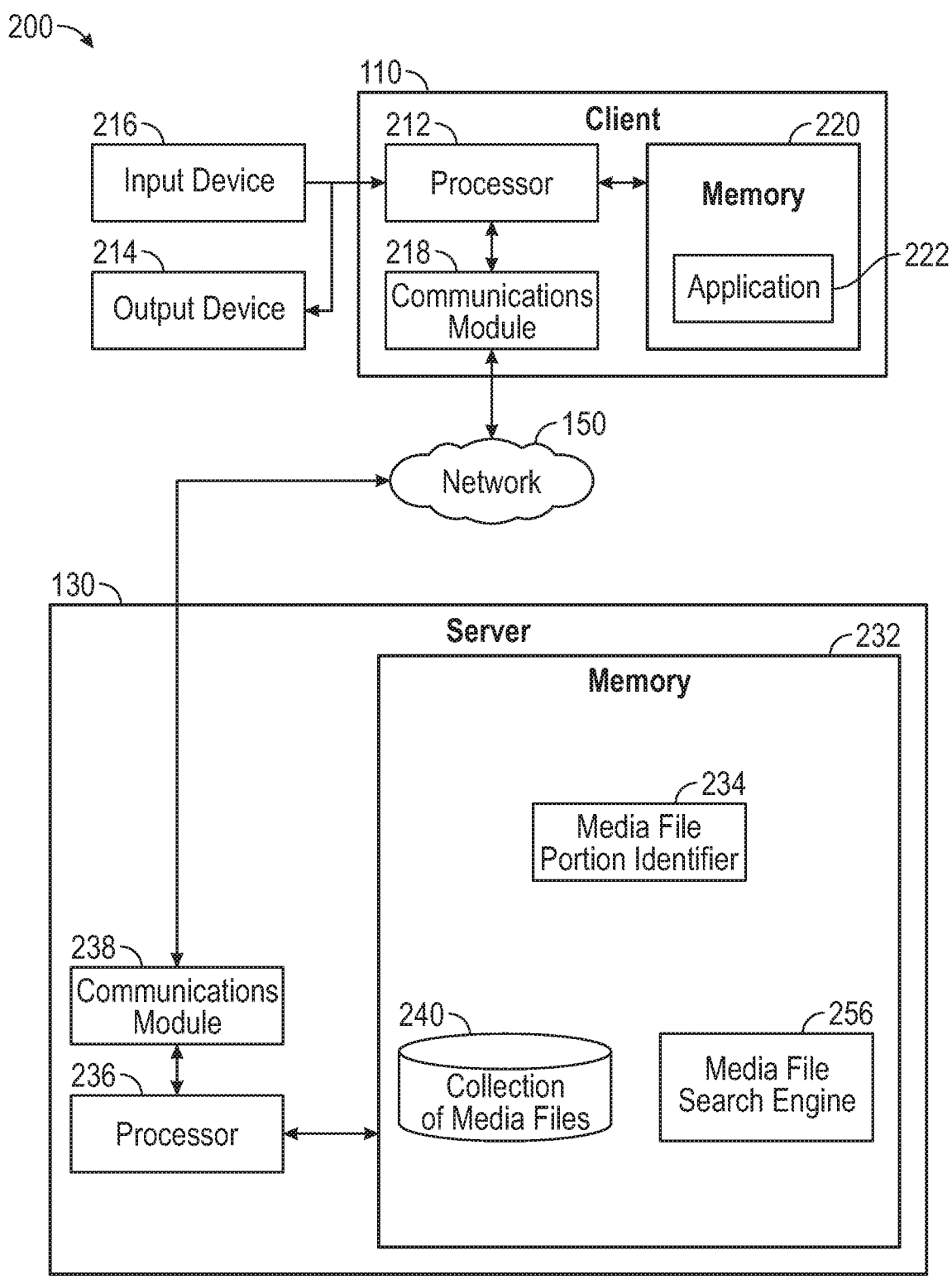
FIG. 2 is a block diagram illustrating an example client and server from the architecture of FIG. 1 according to certain aspects of the disclosure.

FIG. 2 is a block diagram illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes a media file portion identifier 234, a collection of media files 254, and a media file search engine 256.

The collection of media files 254 includes visual media files (e.g., files intended to be displayed visually) such as images, video recordings with or without audio, and visual multimedia (e.g., slideshows). In certain aspects the collection of media files 240 also includes a dense vector for each visual media file (or "data vector") in the collection of media files 240, and each visual media file in the collection of media files 240 is mapped to its corresponding dense vector representation using a unique index value for the media file that is listed in an index. The data vectors can be for both entire visual media files and visual portions of visual media files, as described in further detail below. The dense vector representation of a visual media file (e.g., a 256 dimensional vector) captures the visual nature of the corresponding visual media file (e.g., of a corresponding image). The dense vector representation of a visual media file is such that, for example, given a pair of dense vector representations for a corresponding pair of images, similarity calculations, such as by using a cosine similarity algorithm, can meaningfully capture a visual similarity between the images. In certain aspects, each dense image vector can be normalized prior to later processing, e.g., prior to applying the cosine similarity algorithm to each dense image vector in order to expedite such later processing.

A convolutional neural network can be used to train a model to generate dense vector representations for visual media files, such as for images, and map each visual media file to its corresponding dense vector representation in a dense vector space. The convolutional neural network can be a type of feed-forward artificial neural network where individual neurons are tiled in such a way that the individual neurons respond to overlapping regions in a visual field. The architecture of the convolutional neural network may be in the style of existing well-known image classification architectures such as AlexNet, GoogLeNet, or Visual Geometry Group models. In certain aspects, the convolutional neural network consists of a stack of convolutional layers followed by several fully connected layers. The convolutional neural network can include a loss layer (e.g., softmax or hinge loss layer) to back propagate errors so that the convolutional neural network learns and adjusts its weights to better fit provided image data.

The media file search engine 256 is configured to receive search queries for the collection of media files 240 and provide and identification of visual media files, including individual complete visual media files as well as visual portions of visual media files (with the assistance of media file portion identifier 234) that are responsive to the search queries. In certain aspects, the media file search engine 256 references an index of the media files in the collection of media files 240 in order to facilitate faster identification of media files responsive to search queries.

The processor 236 of the server 130 is configured to execute instructions, such as instructions physically coded into the processor 236, instructions received from software in memory 240, or a combination of both. For example, the processor 236 of the server 130 executes instructions from the media file portion identifier 234 to identify, for each visual media file from the collection of media files 240, portions of the visual media files that are responsive to a group of search queries.

In certain aspects, the visual portions of the plurality of visual media files responsive to the group of search queries can be identified based on previous receipt from a user of an identification of visual portions of visual media files as responsive to a query term with reference to, for example, previous user behavior. For example, the media file portion identifier 234 can obtain historical data of users actions related to cutting or otherwise cropping out visual portions of visual media files in the collection of media files 240 using graphic editing software, and a query term can be identified from actions taken by the user during that time (e.g., from the name of the file the user creates to save the visual portion of the visual media file).

As yet another example, the media file portion identifier 234 can search for existing crops or visual portions of images from the collection of media files 240, such as by crawling or otherwise searching the Internet (e.g., for portions of images displayed on web pages), and use the visual portions of the images from the collection of media files 240 that appear on the Internet along with the words with which they are associated (e.g., words in the web pages in which they appear) as a basis for identifying relevant portions of the images as responsive to query terms.

As another example of how visual portions of visual media files responsive to the group of search queries can be identified based on user behavior, a heat map of areas of images that prior users have found interesting can be generated using past cropping behavior for visual media files from the collection of media files 240. For example, images can be clustered together to group similar looking images, and a heat map can be generated for the clustered images that identifies portions of those images that users have either been cropped out previously, or responded to in previous searches. In this way, past user behavior can be analyzed to predict a portion of a visual media file that a user is likely to crop. Furthermore, past user behavior can also be analyzed to determine sizes and shapes of portions (crops) of the images that are more likely to result in portions of images with sizes and shapes that are responsive to search queries.

As another example, the media file portion identifier 234 can obtain historical data of users actions related to identifying images displayed in search results for a previously submitted search query, and selecting subsets or portions of those images in the search results to be submitted in a reverse image search as described in U.S. patent application Ser. No. 15/054,025, titled "Selected Image Subset Based Search", and filed on Feb. 25, 2016, the contents of which are incorporated for reference purposes herein in their entirety. In certain aspects, the terms of the previously submitted search query can be considered as a basis for the query term associated with the visual portions of the images submitted in the reverse image search. A query term associated with the identified portion of a visual media file can then be associated with the search query, and the visual portion of the at least one of the plurality of visual media files can be stored in memory 232 (e.g., in the collection of media files 240) as responsive to the search query. The stored portion of the visual media file can be, for example, a listing of coordinates in the individual entire visual media file that form the boundaries of the visual portion of the visual media file responsive to the query term and associated with the search query. Alternatively, the stored portion of the visual media file can be, for example, a separate copy of the visual portion of the visual media file that is then stored in the collection of media files 240 as a separate file than the visual media file from which it is taken or copied. In these aspects, the separate copy of the visual portion of the visual media file that is then stored in the collection of media files 240 as a separate file can be associated with a data vector generated for the file, and indexed for use with the media file search engine 256.

Once visual portions of visual media files are identified by the media file portion identifier 234, a data vector is generated for the identified visual portions. Specifically, the visual portion of the visual media file can be submitted (e.g., by the media file portion identifier 234) to the convolutional neural network (e.g., during a forward pass) to generate a data vector for the visual portion of the visual media file. The data vector can be compared to data vectors for other visual media files (e.g., individual complete visual media files) from the collection 240 to identify visual similarity. If the visual similarity between the data vector for the visual portion of the visual media file and a data vectors for another visual media file from the collection 240 exceeds a similarity threshold, then the visual portion of the visual media file can be associated with the same or similar metadata (e.g., keywords, search query terms) as the other visual media file from the collection 240 to which it is deemed sufficiently similar. The visual portion of the visual media file can then be stored in the collection of media files 240 as a separate file and indexed as discussed above.

Visual similarity between the data vector for the visual portion of the visual media file and data vectors for the other visual media files can be assessed using various approaches including, for example, image clustering or object detection. With reference to using object detection to assess visual similarity, in certain aspects, the processor 236 is configured to identify portions of the plurality of visual media files responsive to the group of search queries by first performing object detection for each of the plurality of visual media files to, for example, identify objects in portions of the visual media files, and then determine whether the detected objects are responsive to the search queries. For instance, a visual media file from the collection of media files 240 is provided to a convolutional neural network as described above that has been trained to identify objects in visual media files (e.g., images).

In certain aspects, object detection can be performed by generating a data vector for each cropped portion for each visual media file, and determining a visual similarity between the data vector for each cropped portion and a reference data vector for at least one reference visual media file either associated with at least one known object or known to be responsive to one or more search queries. For example, the reference data vector can be a centroid of several data vectors for visual media files that are clustered together for a known object based on visual similarity to one another. As another example, attentional models (e.g., which area of an image a person would commonly pay attention to) can be used to identify visual portions of visual media files in the collection of media files 240 to be cropped out. Each visual media file from the collection of media files 240 can be cropped using various approaches in order to generate the cropped portions, including, for example, dividing the visual media file into subsets portion using a sliding window approach. In a sliding window approach, a rectangular region of fixed width and height that "slides" across an image from the visual media file, and for each window region (or "portion" or "cropped portion") a data vector is generated to determine if the window has a recognizable object. The sliding window can be configured with a parameter for step size, which is how many pixels are to be skipped in both the (x, y) direction of the image. Step size can be determined on a per-dataset basis and tuned to give optimal performance based on the visual media files in the collection of media files 240. For example, step size can commonly be between 4 to 10 pixels. Another parameter that can be adjusted is the window size, which defines the width and height in pixels of the window that is to be extract from the image taken from the visual media file.

In order to determine a visual similarity between the data vector for each cropped portion of an image and a reference data vector for a reference image associated with at least one known object, data vectors for each of the visual media files in the collection 240, including image files, are generated using the convolutional neural network described above, and the data vectors are then clustered into a predetermined number of clusters according to a clustering algorithm based on a similarity threshold. The clustering algorithm can be, for example, a k-means clustering or another method of vector quantization. The number of clusters can be manually selected, such as, for example, designating that the collection of the media files 240 be divided into 1000 clusters. The data vectors for the visual media files from the collection 240 can be designated to belong to one of the clusters based on a similarity threshold using a clustering algorithm. The similarity threshold can indicate visual similarity, conceptual similarity, keyword similarity, or another measurement of similarity between visual media files. In certain aspects, if the visual similarity between the data vector for a cropped portion of a visual media file and a reference data vector for a reference visual media file associated with at least one known object is deemed to be sufficiently similar (e.g., exceeding a similarity threshold value), then the metadata for the known object can be associated with the cropped portion of the visual media file. Additionally, the metadata for the known object can also be associated with the entire visual media file from which the visual portion of the visual media file was obtained. The visual portion of the visual media file can then be stored in the collection of media files 240 as a separate file and indexed as discussed above.

Once an object is identified by the convolutional neural network in a visual media file, the object is cropped to generate a portion of the visual media file. The object can be cropped using various approaches, such as by create a bounded box that has an average of a 10% bounded space around the object.

The processor 236 of the server 130 also executes instructions to provide, in response to a search query from the group of search queries, an identifier of a portion of at least one of the plurality of visual media files for display as responsive to the search query, along with, in certain aspects, optionally an identifier of at least one entire visual media file from the plurality of visual media files from the collection of media files 240. The identifiers of the visual portion of the visual media file and optionally of the entire visual media file are provided, for example, by the communications module 238 of the server over the network 110 to the communications module 218 of the client 110 so that a processor of the client 110 can provide the identifiers for display in a graphical user interface for an application in 222 in memory of the client 110 displayed on an output device 214 of the client. The application can be, for example, a web browser, a mobile app, or other software application for receiving a media file search query for the collection of media files 240. The identifiers, which can be, for example, thumbnails of the visual media files, visual portions of the visual media files, or the entire visual of the visual media files, are provided for display as responsive to a search query entered using an input device 216 on the client 110 by a user and submitted by the application 222 to the media file search engine 256 on the server 130.

Providing the identifiers of the visual portion of the visual media file and optionally the entire visual media file can include identifying that the entire visual media file exceeds a relevance threshold value to the search query, and identifying that a data vector associated with the visual portion of the visual media file exceeds a similarity threshold value to the entire visual media file, and then providing (e.g., over the network to the client 110 for display in the application 222) the identifiers of the visual portion of the visual media file and the entire visual media file as responsive to the search query. For example, a data vector for a visual media file can be identified as responsive to a search query by comparison to either data vectors for entire visual media files that are known to be responsive to a search query, or comparison to an ideal vector, such as a centroid vector generated from the clustering of several entire media files responsive to the search query. The centroid vector can be used as a basis for the similarity threshold value. In instances where certain media files are not sufficiently available in the collection 240 (e.g., for a subject area not highly populated in the collection 240), visual media files can be identified from the World Wide Web for generation of the centroid vector. As another example, the ideal vector can be generated from a modified entire media file that is augmented to be more in line with a user's preferences. For instance, an image file of a building can be modified for the centroid vector based on knowledge the user prefers buildings with dramatic angles. Yet further, where a user conducting the search may not be interested in an entire media file, the entire media file can nonetheless be used to generate a data vector used for computing image similarity or to inherit relevance.

In certain aspects, the search query can be an image and a reverse image search can be performed to identify both visual portions of visual media files and entire visual media files from the collection of media files 240 that are responsive to the image submitted as the search query. In these aspects, a data vector is generated for the search query image using, for example, the convolutional neural network described above, and if a visual similarity between the data vector for the search query image and a data vector for a portion of at least one of the plurality of visual media files exceeds a similarity threshold value, then the identifier of the visual portion of the visual media file is provided for display as responsive to the search query.

Figure 3A:
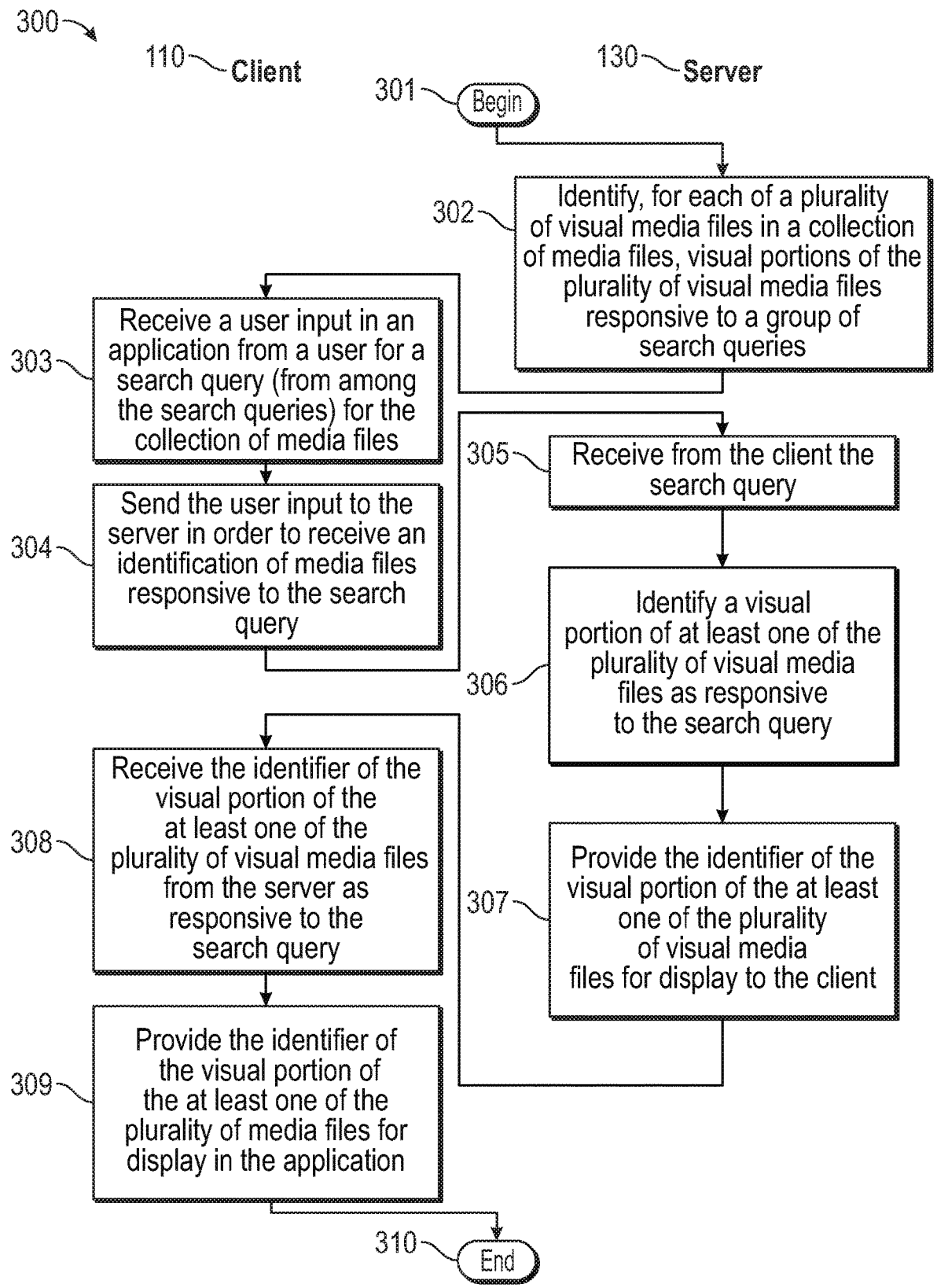
FIGS. 3A and 3B illustrate an example process for identifying visual portions of visual media files responsive to search queries using the example client and server of FIG. 2.

FIG. 3A illustrates an example process 300 for identifying visual portions of visual media files responsive to search queries using the example client 110 and server 130 of FIG. 2. While FIG. 3 is described with reference to FIG. 2, it should be noted that the process steps of FIG. 3 may be performed by other systems.

The process 300 begins by proceeding from beginning step 301 when, for example, a media file portion identifier 234 is initiated on a server 130 to step 302 when, for each of a plurality of visual media files in a collection of media files 240, portions of the plurality of visual media files responsive to a group of search queries are identified by the media file portion identifier 234. A process for identifying portions of the plurality of visual media files responsive to a group of search queries as listed in step 302 is described in further detail below with reference to FIG. 3B. Subsequently, at some later point and on a client 110, in step 303 a user input is received in an application 222 from a user for a search query (from among the search queries) for the collection of media files 240. Next, in step 304, the user input is sent to the server 130 in order to receive an identification of visual media files responsive to the search query.

Turning to the server 130, in step 305, the search query is received from the client 110. In step 306, a portion of at least one of the plurality of visual media files that is responsive to the search query is identified (e.g., from the index described above). In step 307, an identifier (e.g., thumbnails) of the visual portion of the visual media file is provided for display to the client 110 over the network 150. Turning to the client 110, in step 308, the identifier of the visual portion of the visual media file responsive to the search query is received from the server 130, and in step 309 the identified is provided for display in the application 222. The process 300 ends in step 310.

Figure 3B:
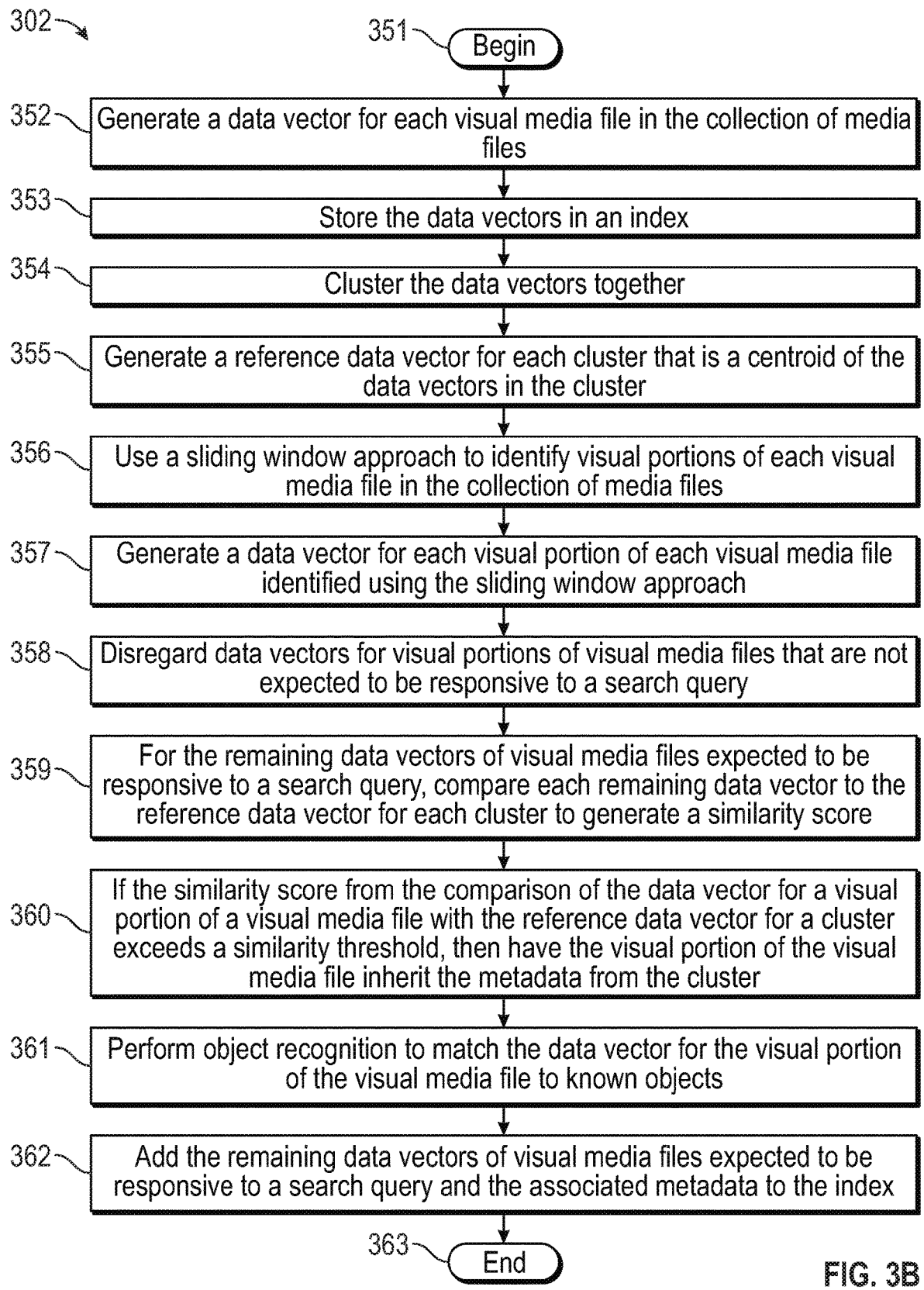

FIG. 3B illustrates an example process for step 302 from FIG. 3A for identifying portions of visual media files responsive to a group of search queries 3A. The process 302 begins by proceeding from beginning step 351 to start creating an index of data vectors to step 352 in which a data vector is generated for each visual media file in the collection of media files 240. Next, in step 353, the data vectors are stored in an index, and in step 354 the data vectors are clustered together using k-means, another method of vector quantization, or based on a similarity threshold. In step 355, a reference data vector is generated for each cluster (if not already previously generated) that is a centroid of the data vectors in the cluster, and in step 356 a sliding window approach is used to identify visual portions of each visual media file in the collection of media files 240.

Subsequently, in step 357, a data vector is generated for each visual portion of each visual media file identified using a sliding window approach and in step 358 data vectors for visual portions of visual media files that are not expected to be responsive to a search query are disregarded. In step 359, each remaining data vector is compared to the reference data vector for each cluster to generate a similarity score for the remaining data vectors of visual media files expected to be responsive to a search query, and in step 360, if the similarity score from the comparison of the data vector for a visual portion of a visual media file with the reference data vector for a cluster exceeds a similarity threshold, then the visual portion of the visual media file inherits the metadata from the cluster. In certain aspects, for step 360, when the similarity score exceeds a threshold for multiple reference data vectors (e.g., centroids), then the visual portion of the visual media file can either inherit metadata from the reference data vector associated with the maximum similarity score, or inherit data based on a weighted average of metadata across the different reference vectors with weighting proportional to their respective similarity scores. In step 361, object recognition is optionally performed to match the data vector for the visual portion of the visual media file to known objects, and can be used to remove data vectors not matched with known object, and in step 362 the remaining data vectors of visual media files expected to be responsive to a search query and the associated metadata are added to the index. The process ends in step 363.

FIG. 3A set forth an example process 300 for identifying visual portions of visual media files responsive to search queries using the example client 110 and server 130 of FIG. 2. An example will now be described using the example process 300 of FIG. 3, a client 110 that is a desktop computer, an application 222 that is a web browser, visual media files from the collection of media files 240 that are images, and an image search query for "statue of liberty".

The process 300 begins by proceeding from beginning step 301 when, for example, a media file portion identifier 234 is initiated on a server 130 to step 302 when, for each of a plurality of visual media files in the collection of media files 240, portions of the visual media files responsive to a group of search queries that include the search query "statue of liberty" are identified by the media file portion identifier 234. Specifically, each image file from the collection of media files 240 is cropped using a sliding window approach with a rectangular region of 200 pixels by 150 pixels that slides across each image with a step size of 10 pixels, and for each window region a data vector is generated using a convolutional neural network. The data vector for each window is clustered into any of 1000 clusters according to a k-means clustering algorithm based on a visual similarity threshold of 80% similarity. If the visual similarity between the data vector for the window of the image file and a reference data vector for a reference image file associated with the Statue of Liberty exceeds an 80% visual similarity threshold, then the metadata for the Statue of Liberty reference image file is associated with a new portion image file created from the window portion of the image file and with a bounded box that has an average of a 10% bounded space around the identified object, the Statue of Liberty. The visual portion image file is then stored in the collection of media files 240 as a separate file and indexed.

Subsequently, at some later point and on a client 110, in step 303 an image search query for "statue of liberty" is received from a user in a web browser application 222 on a desktop computer client 110. Next, in step 304, the image search query for "statue of liberty" is sent to the server 130 in order to receive an identification of image files responsive to the image search query "statue of liberty".

Turning to the server 130, in step 305, the image search query for "statue of liberty" is received from the desktop computer client 110. In step 306 with reference to the index for the collection of media files 240 that has indexed portions of image files with metadata for the Statue of Liberty, indexed portions of image files and entire image files responsive to the query for "statue of liberty" are identified. In step 307, thumbnails of the entire image files and the visual portions of image files are provided for display to the desktop computer client 110 over the network 150.

Figure 4A:
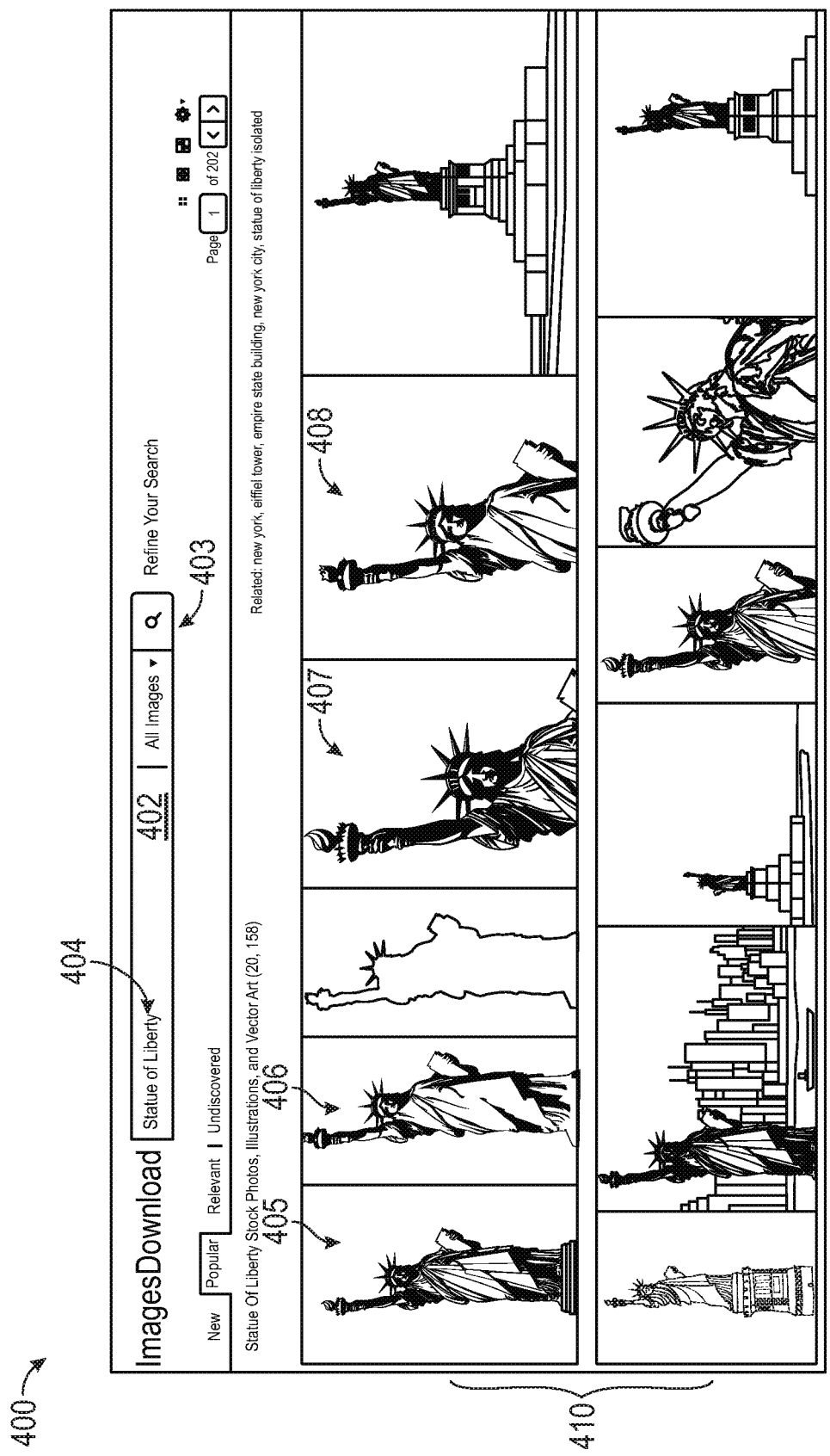
FIGS. 4A and 4B are example illustrations associated with the example process of FIG. 3.

Turning to the desktop computer client 110, in step 308, the thumbnails of the entire image files and the visual portions of the image files responsive to the image search query for "statue of liberty" are received from the server 130, and in step 309 the thumbnails are provided for display in the web browser application 222 on the output device 214 of the desktop computer client 110 as provided in the example illustration 400 of FIG. 4A. The illustration 400 includes an identification in the web browser application 222 of the image search query for "statue of liberty" 404 entered into a search field 402 and submitted using a search button 403. The illustration also includes a display area 410 for the thumbnails responsive to the image search query for "statue of liberty". The thumbnails include thumbnails for two entire image files 405 and 406 responsive to the image search query for "statue of liberty", and two portions of image files 407 and 408 responsive to the image search query for "statue of liberty". In certain aspects, by presenting thumbnails of portions of image files in the display area 410, the media file search engine 256 is able to provide search results for display that can exclude or otherwise censor other portions of images where, for example, a displayed portion of an image file is relevant to an image search query but other portions are not both not relevant to the search query and not displayed because they include adult themed or otherwise sensitive image content not commonly displayed to unspecified users.

Figure 4B:
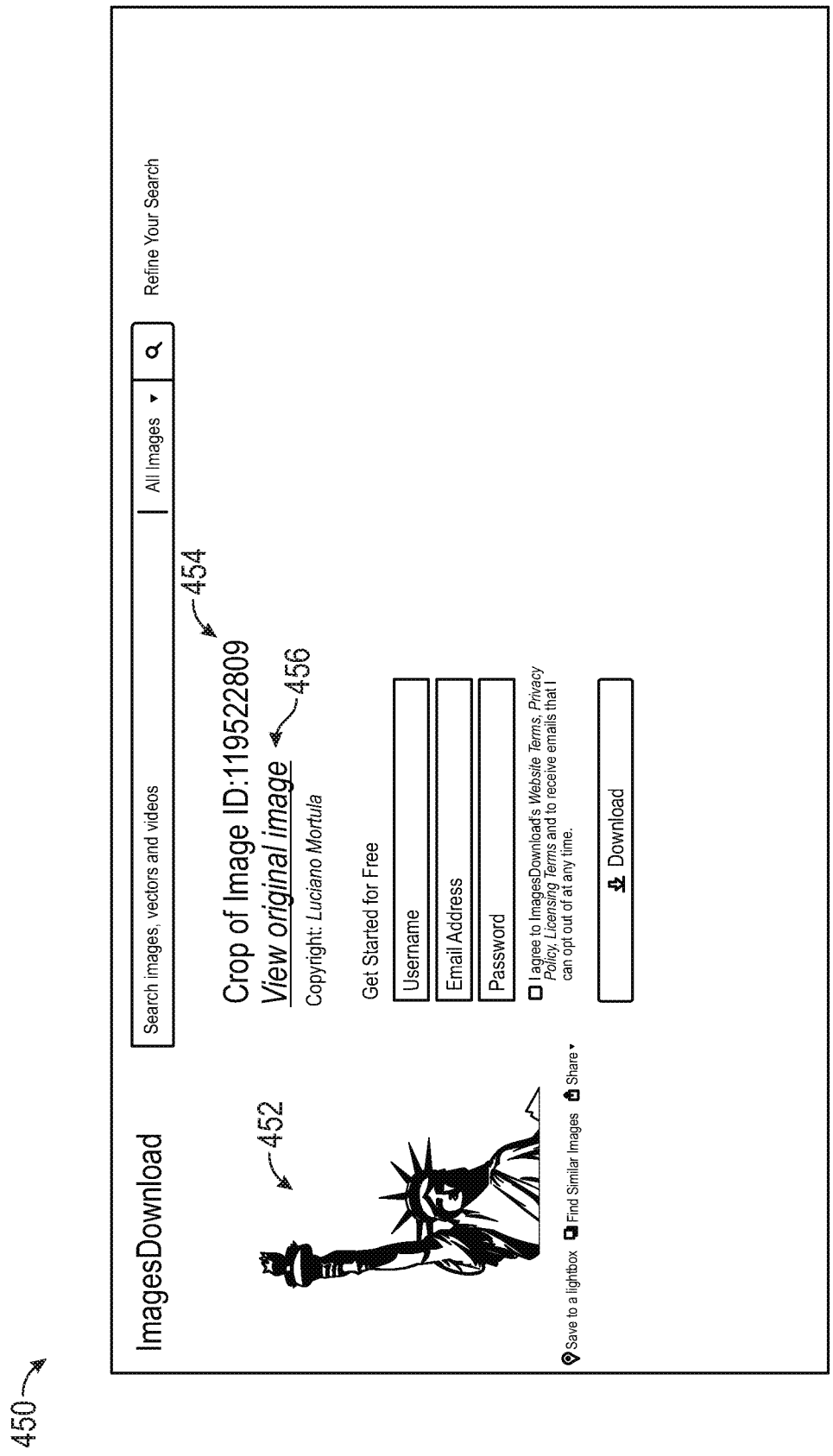

In the display area 410 for the thumbnails responsive to the image search query for "statue of liberty", if the user selects, for example, the first portion image file 407, the user is provided in the web browser application 222 with a web page 450 as illustrated in FIG. 4B providing additional details of the first portion image file 407. The web page includes a higher resolution image 452 of the thumbnail of the first portion image file 407, an identification 454 of the entire image file from which the visual portion image file is cropped, and a link 456 to view the entire image file.

In certain aspects, a portion image file, such as portion image file 407 of entire image file 405, can be offered for sale to the user (e.g., to download) for a portion of the sale price of the entire image file 405. The sale price of a portion image file can be based on, for example, how many objects the visual portion image file includes from the total number of objects in a corresponding entire image file, or the dimensions or file size of the visual portion image relative to the corresponding entire image file.

The process 300 ends in step 310.

Figure 5:
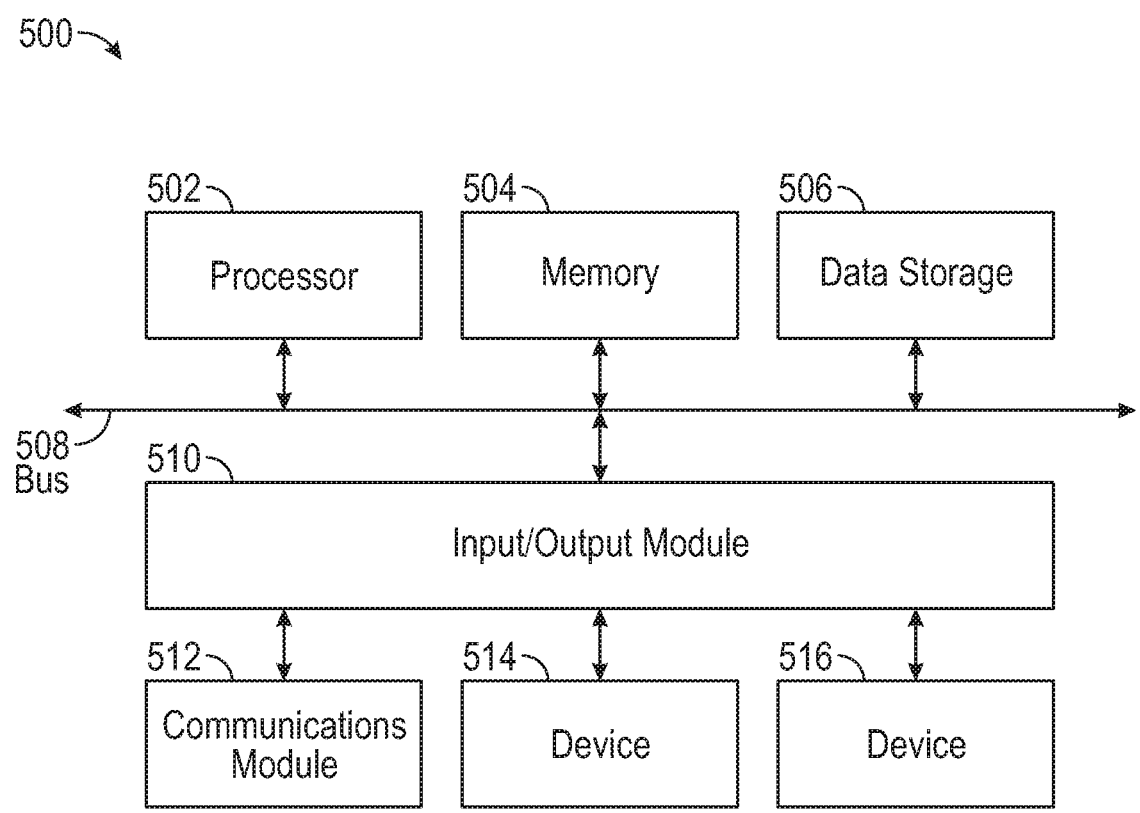
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processors 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for identifying visual portions of visual media files responsive to search queries, the method comprising:
    identifying, for each of a plurality of visual media files from a collection of media files, visual portions of the plurality of visual media files responsive to a group of search queries;
    indexing, as separate visual media files from the collection of media files, the visual portions of the plurality of visual media files that are identified;
    receiving a search query related to the group of search queries;
    identifying, as responsive to the search query, at least one of the separate visual media files that is indexed from the collection of media files;
    determining whether a visual similarity between a data vector of the search query and a data vector of the at least one of the separate media files that is indexed exceeds a similarity threshold value; and
    providing for display, as responsive to the search query and based on determining that the visual similarity between the data vector of the search query and the data vector of the at least one of the separate media files that is indexed exceeds the similarity threshold value, at least an identifier corresponding to the at least one of the separate visual media files that is indexed from the collection of media files.

2. The method of claim 1, wherein identifying the visual portions of the plurality of visual media files responsive to the group of search queries comprises:
    receiving from a user an identification of the one of the visual portions of the plurality of visual media files as responsive to a query term;
    associating the query term with the search query; and
    storing in memory the visual portion of the plurality of visual media files as responsive to the search query.

3. The method of claim 1, wherein identifying the visual portions of the plurality of visual media files responsive to the group of search queries comprises performing object detection for each of the plurality of visual media files.

4. The method of claim 3, wherein performing object detection for each of the plurality of visual media files comprises:
    cropping at least a visual portion of each of the plurality of visual media files;
    generating a data vector for each cropped visual portion for each of the plurality of visual media files;
    determining a visual similarity between the data vector for each cropped visual portion of each of the plurality of visual media files and a reference data vector representative of at least one reference visual media file associated with at least one known object; and
    associating metadata for the at least one known object with the cropped visual portion of one of the plurality of visual media files when the visual similarity between the data vector for the cropped visual portion of one of the plurality of visual media files and the reference data vector exceeds the similarity threshold value.

5. The method of claim 4, wherein performing object detection for each of the plurality of visual media files further comprises indexing the cropped visual portion of the one of the plurality of visual media files in the collection of media files.

6. The method of claim 3, wherein performing object detection for each of the plurality of visual media files comprises:
    dividing each of the plurality of visual media files into a plurality of subsets visual portions;
    generating a data vector for each of the plurality of subset visual portions of each of the plurality of visual media files;
    determining a visual similarity between the data vector for each of the plurality of subset visual portions of each of the plurality of visual media files and a reference data vector for a reference visual media file associated with at least one known object; and
    associating metadata for the at least one known object with the cropped subset visual portion of one of the plurality of visual media files when the visual similarity between the data vector for the cropped visual portion of one of the plurality of visual media files and the reference data vector exceeds the similarity threshold value.

7. The method of claim 6, wherein the dividing each of the plurality of visual media files into a plurality of subsets visual portions is performed using a sliding window.

8. The method of claim 1, wherein the providing for display at least the identifier corresponding to the at least one of the separate visual media files that is indexed from the collection of media files comprises:
identifying the data vector of the at least one of the separate media files that is indexed as exceeding the similarity threshold value to another visual media file responsive to the search query.

9. The method of claim 1, wherein the identifiers comprise thumbnails.

10. A system for identifying visual portions of visual media files responsive to search queries, the system comprising:
a memory comprising instructions; a processor configured to execute the instructions to:
identify, for each of a plurality of visual media files from a collection of media files, visual portions of the plurality of visual media files responsive to a group of search queries;
index, as separate visual media files from the collection of media files, the visual portions of the plurality of visual media files that are identified;
receive a search query related to the group of search queries;
identify, as responsive to the search query, at least one of the separate visual media files that is indexed from the collection of media files;
determine whether a visual similarity between a data vector of the search query and a data vector of the at least one of the separate media files that is indexed exceeds a similarity threshold value; and
provide for display, as responsive to the search query and based on determining that the visual similarity between the data vector of the search query and the data vector of the at least one of the separate media files that is indexed exceeds the similarity threshold value, at least an identifier corresponding to the at least one of the separate visual media files that is indexed from the collection of media files.

11. The system of claim 10, wherein the processor being configured to identify the visual portions of the plurality of visual media files responsive to the group of search queries comprises the processor being configured to:
receive from a user an identification of the visual portion of the plurality of visual media files as responsive to a query term;
associate the query term with the search query; and
store in memory the visual portion of the plurality of visual media files as responsive to the search query.

12. The system of claim 10, wherein the processor being configured to identify the visual portions of the plurality of visual media files responsive to the group of search queries comprises the processor being configured to perform object detection for each of the plurality of visual media files.

13. The system of claim 12, wherein the processor being configured to perform object detection for each of the plurality of visual media files comprises the processor being configured to:
crop at least a visual portion of each of the plurality of visual media files;
generate a data vector for each cropped visual portion for each of the plurality of visual media files;
determine a visual similarity between the data vector for each cropped visual portion of each of the plurality of visual media files and a reference data vector representative of at least one reference visual media file associated with at least one known object; and
associate metadata for the at least one known object with the cropped visual portion of one of the plurality of visual media files when the visual similarity between the data vector for the cropped visual portion of one of the plurality of visual media files and the reference data vector exceeds the similarity threshold value.

14. The system of claim 13, wherein the processor being configured to perform object detection for each of the plurality of visual media files further comprises the processor being configured to index the cropped visual portion of the one of the plurality of visual media files in the collection of media files.

15. The system of claim 12, wherein the processor being configured to perform object detection for each of the plurality of visual media files comprises the processor being configured to:
divide each of the plurality of visual media files into a plurality of subsets visual portions;
generate a data vector for each of the plurality of subset visual portions of each of the plurality of visual media files;
determine a visual similarity between the data vector for each of the plurality of subset visual portions of each of the plurality of visual media files and a reference data vector for a reference visual media file associated with at least one known object; and
associating metadata for the at least one known object with the cropped subset visual portion of one of the plurality of visual media files when the visual similarity between the data vector for the cropped visual portion of one of the plurality of visual media files and the reference data vector exceeds the similarity threshold value.

16. The system of claim 15, wherein the dividing each of the plurality of visual media files into a plurality of subsets visual portions is performed using a sliding window.

17. The system of claim 10, wherein the processor being configured to provide at least the identifier corresponding to the at least one of the separate visual media files that is indexed from the collection of media files comprises the processor being configured to:
identify the data vector of the at least one of the separate media files that is indexed as exceeding the similarity threshold value to another visual media file responsive to the search query.

18. A non-transitory machine-readable storage medium comprising machine-readable instructions for causing a processor to execute a method for identifying visual portions of visual media files responsive to search queries, the method comprising:
identifying, for each of a plurality of visual media files from a collection of media files, visual portions of the plurality of visual media files responsive to a group of search queries;
indexing, as separate visual media files from the collection of media files, the visual portions of the plurality of visual media files that are identified;
receiving a search query related to the group of search queries;
identifying, as responsive to the search query, a data vector associated with one of the separate visual media files indexed from the collection of media files as exceeding a similarity threshold value to another visual media file exceeding a relevance threshold value to the search query; and providing for display, as responsive to the search query and based on identifying that the data vector associated with one of the separate visual media files indexed from the collection of media files as exceeding the similarity threshold value exceeds the similarity threshold value to another visual media file, at least a thumbnail corresponding to the one of the separate visual media files that is indexed from the collection of media files.

\* \* \* \* \*